(12) United States Patent
Jin

(10) Patent No.: US 8,241,533 B2
(45) Date of Patent: Aug. 14, 2012

(54) USE OF CARBONATES

(76) Inventor: Chaoyang Jin, Beijing (CN)

( * ) Notice: Subject to any disclaimer, the term of this patent is extended or adjusted under 35 U.S.C. 154(b) by 136 days.

(21) Appl. No.: 12/663,482

(22) PCT Filed: Jun. 4, 2008

(86) PCT No.: PCT/CN2008/001091
§ 371 (c)(1),
(2), (4) Date: Jan. 13, 2010

(87) PCT Pub. No.: WO2008/151511
PCT Pub. Date: Dec. 18, 2008

(65) Prior Publication Data
US 2010/0176355 A1  Jul. 15, 2010

(30) Foreign Application Priority Data

Jun. 8, 2007 (CN) .......................... 2007 1 0100349

(51) Int. Cl.
C09K 3/00 (2006.01)
C07D 317/36 (2006.01)
C07D 317/40 (2006.01)
C07C 69/96 (2006.01)

(52) U.S. Cl. ........ 252/700; 549/228; 549/229; 549/230; 558/260; 558/277

(58) Field of Classification Search .................. 252/700; 549/228, 229, 230; 558/260, 277
See application file for complete search history.

(56) References Cited

U.S. PATENT DOCUMENTS 3,888,786 A * 6/1975 Maulding ...................... 252/700
4,313,843 A * 2/1982 Bollyky et al. ............... 252/700

FOREIGN PATENT DOCUMENTS

WO    WO2008 151511 A1    12/2008

* cited by examiner

*Primary Examiner* — David W Wu
*Assistant Examiner* — Vu A Nguyen
(74) *Attorney, Agent, or Firm* — Hughes Socol Piers Resnick & Dym, Ltd.; Michael A. Hierl; Todd S. Parkhurst

(57) ABSTRACT

This invention publishes new usages of kinds of carbonic ester compounds. The new usage described in this invention is related to the application of carbonic ester compounds in the preparation of solvents for chemiluminescent systems. This invention also provides luminescent compositions, luminescent liquids and oxidized liquids that contain carbonic ester compounds. Chemiluminescent compositions containing carbonic ester compounds can decrease reaction pressure effectively, facilitate reaction balance heading to luminescence reaction, generate larger luminescent output without adding catalyst, decrease the dosage of catalyst or not need adding catalyst, decrease influences of over-high output at the reaction start caused by catalyst on whole luminescent time, and ensure stable light output from luminescent compositions. Carbonic ester compounds, especially long carbon chain carbonic ester, have the characters of non-toxic and high flash point, and have suitable solubility on ordinary bis oxalate ester. Carbonic ester compounds are environment-friendly solvents, which can be widely accepted and recognized no matter in industrial synthesization or in applications.

13 Claims, No Drawings

USE OF CARBONATES

FIELD OF THE INVENTION

This invention is related to new usages of carbonic ester compounds.

DESCRIPTION OF THE RELATED ART

There are several patents that already describe the principles and technologies of chemiluminescent systems, e.g. U.S. Pat. Nos. 4,678,608; 3,749,679; 3,755,233. Visible chemiluminescence or infrared radiation can be produced in the liquid phase like Hydrogen Peroxide. This occurs after a reaction between a fluorescing agent or dye, and bis oxalate ester. This bis oxalate ester normally refers to a compound with the general form of

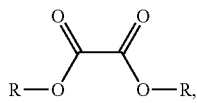

in which R normally represents various forms of phenyl. Great strides have been made in the development of these chemicals by improving the bis oxalate ester disclosed by U.S. Pat. No. 3,749,679. All of the chemicals mentioned so far all use an organic solvent as a transport system. Since this solvent comprises 60%-98% of the entire system by weight, its chemical, physical, and environment-friendly characteristics are very important influences on all chemical luminescent products. There is a massive amount of literature on the various solvents that can be used in chemiluminescence systems. A couple of the most important documents are available in the following patents: U.S. Pat. Nos. 5,597,517; 6,126,871 etc.

In the current applications of this technology, chemiluminescent systems are commonly comprised of bis oxalate ester, a fluorescing agent, and hydrogen peroxide. A catalyst can be included for enhancing intensity and efficiency. The oxidized liquid, also named activator, is consisting of hydrogen peroxide, solvents and a catalyst. The luminescent liquid is made by combining bis oxalate ester, a fluorescing agent, and solvents. A chemiluminescence reaction occurs when the oxidized liquid and the luminescent liquid are combined. The luminescent strength and lifetime of this chemical reaction can be adjusted by the quantity of the catalyst in the oxidized liquid.

Currently, chemiluminescent products are normally sealed in transparent plastic containers. Because $CO_2$ is created in the final parts of the chemiluminescent reaction, pressure may continually rise in the enclosed container. The resulting pressure may be anywhere from 0.3 MPa to 2 MPa. This creates stringent requirements on the material strength and sealing effect of the container. Even though precautions against leakage are high, there is always a chance that containment may be compromised due to the inescapable minute probability of failure. A containment failure of this nature may create a failure in the product functions or induce a pollutant into the environment. It is very practical to decrease the pressure of the chemical reaction within the container. Achieving this can be beneficial. One benefit is making it easier to apply lighter and thinner container shells to the luminescent device; another involves decreasing the resultant costs of manufacturing, and yet another is the possibilities for creating variations in the shell designs. But none of these are as important as decreasing product malfunctions, lowering the probability of containment failure, and reducing the possibilities of pollutants escaping into the atmosphere.

Invention Publication

The objective of this invention is to provide new usages of carbonic ester compounds.

The new usages of carbonic ester compounds described in this invention are related to new ways of applying carbonic ester compounds for the solvents of chemiluminescent compositions preparation.

The structural formula of said carbonic ester compounds is shown as the formula (I):

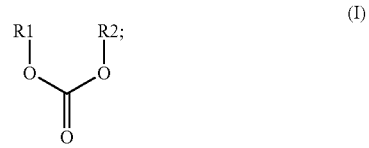

Wherein, R1 and R2 are identical or different. The total carbon atom of said R1 and R2 each contains is 1-18. With said each R1 and R2 is selected from the following groups from 1 to 5:

1. Linear or branched alkyl;
2. Cycloalkyl;
3. Groups obtained by doing halogen substitution to groups defined by 1 or 2;
4. Groups obtained by doing alkoxy substitution to groups defined by 1;
5. Alkylidene or alkenylene;

If R1 or R2 is alkylidene or alkenylene, said carbonic ester compounds are having the following structural formula (II) or (III);

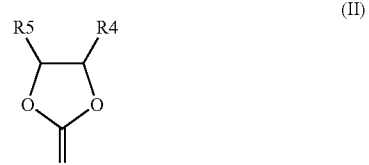

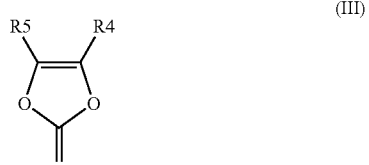

Wherein, each of R4 and R5 is a Hydrogen atom (H), alkyls with total carbon atoms from 1 to 6, or cycloalkyls with total carbon atoms from 1 to 6.

The best carbonic ester compounds to be used are dimethyl carbonate, dibutyl carbonate, dicaprylyl carbonate, propylene carbonate or butyl methyl carbonate. Out of these, dicaprylyl carbonate and propylene carbonate are the two best.

Said chemiluminescent compostions contain bis oxalate ester, a fluorescing agent, hydrogen peroxide, and solvents. These solvents contain said carbonic ester compounds.

Said carbonic ester compounds account for 1% or more of the total volume of the chemiluminescent compositions.

Besides carbonic ester compounds, there are other organic solvents used as the solvents of the chemiluminescent compositions. These other organic solvents are at least one of following 11 organic chemicals:

Dibutyl phthalate; dimethyl phthalate; dioctyl phthalate; butyl benzoate; ethyl benzoate; tert-butyl alcohol; tributyl citrate; triethyl citrate; dioctyl adipate; didecyl adipate; and ditridecyl adipate.

These chemiluminescent compositions can be made with any practical methods, such as by combining oxidized liquid and luminescent liquid. In which, luminescent liquids contain bis oxalate ester, a fluorescing agent and solvents, where said solvents contain carbonic ester compounds. Oxidized liquids contain hydrogen peroxide and solvents, where said solvents contain carbonic ester compounds.

Among the said luminescent liquids, said carbonic ester compounds in solvents account for 1-98% of the luminescent liquid volume.

Among the said oxidized liquids, said carbonic ester compounds in solvents accounts for 1-98% of the oxidized liquid volume.

Besides carbonic ester compounds, there are other organic solvents used as the solvent in the luminescent liquids and/or oxidized liquid. These organic solvents are at least one of the following 11 organic chemicals:

Dibutyl phthalate; dimethyl phthalate; dioctyl phthalate; butyl benzoate; ethyl benzoate; tert-butyl alcohol; tributyl citrate; triethyl citrate; dioctyl adipate; didecyl adipate; and ditridecyl adipate.

Among the said luminescent liquids, the volume ratios of carbonic ester compounds to other solvents are from 3:7 to 7:3.

This invention also provides a chemiluminescent composition, which contains: bis oxalate ester, fluorescing agent, hydrogen peroxide and solvents; said solvents contain carbonic ester compounds.

Besides carbonic ester compounds, the solvents of said luminescent combinations can include other organic solvent; said other organic solvents are at least one of following 11 organic solvents:

Dibutyl phthalate; dimethyl phthalate; dioctyl phthalate; butyl benzoate; ethyl benzoate; tert-butyl alcohol; tributyl citrate; triethyl citrate; dioctyl adipate; didecyl adipate; and ditridecyl adipate.

This invention also provides a luminescent liquid of chemiluminescent composition, which contains: bis oxalate ester, fluorescing agent and solvents; wherein said solvents contain said carbonic ester compounds.

Besides carbonic ester compounds, the solvents of luminescent liquid contains other organic solvents, said other organic solvents are at least one of following 11 organic chemicals:

Dibutyl phthalate; dimethyl phthalate; dioctyl phthalate; butyl benzoate; ethyl benzoate; tert-butyl alcohol; tributyl citrate; triethyl citrate; dioctyl adipate; didecyl adipate; and ditridecyl adipate.

This invention also provides an oxidized liquid of chemiluminescent composition, which contains hydrogen peroxide and solvents; wherein said solvents contain said carbonic ester compounds.

Besides carbonic ester compounds, the solvents of said oxidized liquid contains other organic solvents; these other organic solvents are at least one of following 11 organic solvents:

Dibutyl phthalate; dimethyl phthalate; dioctyl phthalate; butyl benzoate; ethyl benzoate; tert-butyl alcohol; tributyl citrate; triethyl citrate; dioctyl adipate; didecyl adipate; and ditridecyl adipate.

Following embodiments are beneficial to understand this invention, but not limited to the invention.

Best Practices of the Invention

The following experimental methods in our practices are regarded as normal methods unless otherwise noted.

The actual preparation methods of luminescent liquids and oxidized liquids in our practices can be found below (for convenience, we mark luminescent liquids with F1, F2, F3 . . . and oxidized liquids with Y1, Y2, Y3 . . . ):

F1: Add 135 g bis(2,4,5-trichloro-6-carbopentoxyphenyl) oxalate (hereafter referred to as CPPO) and 1.5 g 2-ethyl-9,10-Bis(phenylethynyl) anthracene into 1 L dibutyl phthalate (hereafter referred to as DBP), then heat the mixture to 80° C. and stir until the CPPO and 2-ethyl-9,10-Bis(phenylethynyl) anthracene are completely dissolved. This creates a green oxalate solution. Place it at room temperature.

F2: Add 135 g bis(2,4,5-trichloro-6-carbopentoxyphenyl) oxalate and 1.5 g 2-ethyl-9,10-Bis(phenylethynyl) anthracene into 1 L butyl benzoate (below referred to as BB), then heat the mixture to 80° C. and stir until the BB and 2-ethyl-9,10-Bis(phenylethynyl) anthracene are completely dissolved. This creates a green oxalate solution. Place it at room temperature.

F3: Add 135 g bis(2,4,5-trichloro-6-carbopentoxyphenyl) oxalate and 1.5 g 2-ethyl-9,10-Bis(phenylethynyl) anthracene into 1 L dimethyl carbonate (hereafter referred to as DMC), then heat the mixture to 80□ and stir until the bis(2,4,5-trichloro-6-carbopentoxyphenyl)oxalate and the 2-ethyl-9,10-Bis(phenylethynyl) anthracene are completely dissolved, this creates a green oxalate solution. Place it at room temperature.

F4: Combine dimethyl carbonate (DMC) and DBP into a 1 L solution with a volume ratio of DMC/DBP=2/8, then add 135 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until bis(2,4,5-trichloro-6-carbopentoxyphenyl)oxalate and 2-ethyl-9,10-Bis(phenylethynyl) anthracene are completely dissolved. This creates a green oxalate solution. Place it at room temperature.

F5: Combine dimethyl carbonate (DMC) and DBP into a 1 L solution with a volume ratio of DMC/DBP=3/7, then add 135 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F6: Combine dimethyl carbonate (DMC) and DBP into a 1 L solution with a volume ratio of DMC/DBP=4/6, then add 135 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until the bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F7: Combine dimethyl carbonate (DMC) and BB into 1 L solution with a volume ratio of DMC/BB=2/8, then add 135 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until the bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F8: Combine dimethyl carbonate (DMC) and BB into 1 L solution with a volume ratio of DMC/BB=3/7, then add 135 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until the bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F9: Combine dimethyl carbonate (DMC) and BB into 1 L solution with a volume ratio of DMC/BB=4/6, then add 135 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until the bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F10: Combine dimethyl carbonate (DMC) and BB into 1 L solution with a volume ratio of DMC/BB=3/97, then add 135 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until the bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F11: Add 25 g of bis(2,4,5-trichloro-6-iso-carbopentoxyphenyl)oxalate(CIPO) into 25 g of dibutyl carbonate (DBC) to create a 50 g solution with a ratio of DBC/CIPO=5/5 (in weight), then add 1 g 9,10-Bis(4-methoxyphenyl)-2-chloroanthracene into the solution. Heat the mixture to 80° C. and stir until the CIPO and 9,10-Bis(4-methoxyphenyl)-2-chloroanthracene are completely dissolved. Maintain the temperature of the solution to prevent the precipitation of CIPO. The solution then becomes a blue high-dense oxalate solution. Place it at room temperature.

F12: Add 25 g BB into 25 g bis(2,4,5-trichloro-6-iso-carbopentoxyphenyl)oxalate (CIPO) to create 50 g solution with a ratio of BB/CIPO=5/5 (in weight), then add 1 g 9,10-Bis(4-methoxyphenyl)-2-chloroanthracene into the solution, heat the mixture to 80° C. and stir until the CIPO and 9,10-Bis(4-methoxyphenyl)-2-chloroanthracene are completely dissolved, maintain the temperature of the solution to prevent the precipitation of CIPO. The solution then becomes a blue high-dense oxalate solution. Place it at room temperature.

F13: Add 135 g bis(2,4,5-trichloro-6-carbopentoxyphenyl)oxalate and 1.5 g 2-ethyl-9,10-Bis(phenylethynyl) anthracene into 1 L vinylene carbonate, heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F14: Add 135 g bis(2,4,5-trichloro-6-carbopentoxyphenyl)oxalate and 1.5 g 2-ethyl-9,10-Bis(phenylethynyl) anthracene into 1 L propylene carbonate(PC), then heat the mixture to 80° C. and stir until bis(2,4,5-trichloro-6-carbopentoxyphenyl)oxalate and 1.5 g 2-ethyl-9,10-Bis(phenylethynyl) anthracene are completely dissolved, this creates a green oxalate solution. Place it at room temperature.

F15: Add 135 g bis(2,4,5-trichloro-6-carbopentoxyphenyl)oxalate and 1.5 g 2-ethyl-9,10-Bis(phenylethynyl) anthracene into 1 L butyl methyl carbonate(BMC), heat the mixture to 80° C. and stir until bis(2,4,5-trichloro-6-carbopentoxyphenyl)oxalate and 1.5 g 2-ethyl-9,10-Bis(phenylethynyl) anthracene are completely dissolved, this creates a green oxalate solution. Place it at room temperature.

F16: Add 135 g bis(2,4,5-trichloro-6-carbonpentoxyphenyl)oxalate and 1.5 g 2-ethyl-9,10-Bis(phenylethynyl) anthracene into 1 L1-Chloroethyl isopropyl carbonate, then heat the mixture to 80° C. and stir until bis(2,4,5-trichloro-6-carbonpentoxyphenyl)oxalate and 1.5 g 2-ethyl-9,10-Bis(phenylethynyl) anthracene are completely dissolved, this creates a green oxalate solution. Place it at room temperature.

F17: Add 135 g bis(2,4,5-trichloro-6-carbopentoxyphenyl)oxalate and 1.5 g 2-ethyl-9,10-Bis(phenylethynyl) anthracene into 1 L methyl 2-ethoxyethyl carbonate, then heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

The preparation of methyl 2-ethoxyethyl carbonate: put 4 mol dimethyl carbonate and 1 mol 2-ethoxyethanol in a reflux reaction with 0.01 mol KOH as a catalyst under 62-68° C. for 2 hours, then use distillation devices to separate out methanol. Cool the reaction material to room temperature and filter KOH, then reduce the pressure and distill out methyl 2-ethoxyethyl carbonate.

F18: Add 135 g bis(2,4,5-trichloro-6-carbopentoxyphenyl)oxalate and 1.5 g 2-ethyl-9,10-Bis(phenylethynyl) anthracene into 1 L 1-chloroethyl cyclohexyl carbonate, then heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F19: Add 135 g bis(2,4,5-trichloro-6-carbopentoxyphenyl)oxalate and 1.5 g 2-ethyl-9,10-Bis(phenylethynyl) anthracene into 1 L dibutyl carbonate solution, heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F20: Add 135 g bis(2,4,5-trichloro-6-carbopentoxyphenyl)oxalate and 1.5 g 2-ethyl-9,10-Bis(phenylethynyl) anthracene into 1 L dicaprylyl carbonate solution, heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F21: Add 135 g bis(2,4,5-trichloro-6-carbopentoxyphenyl)oxalate and 1.5 g 2-ethyl-9,10-Bis(phenylethynyl) anthracene into 1 L didecyl carbonate solution, then heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

The preparation of didecyl carbonate: heat 4 mol n-Decanol to 80° C. and add 0.5% (in weight) potassium carbonate as catalyst, then drip 1 mol dimethyl carbonate into it slowly. After a 2-hour reflux reaction, use distillation devices to separate out methanol, then increase the reaction temperature to 140-160° C. and maintain it for 4-6 hours. After this, cool the reaction solution to room temperature and filter the catalyst, then reduce the pressure and distill out didecyl carbonate.

F22: Add 100 g bis(2,4,5-trichloro-6-carbopentoxyphenyl)oxalate and 1.5 g 2-ethyl-9,10-Bis(phenylethynyl) anthracene into 1 L didecyl carbonate solution, then heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F23: Combine didodecyl carbonate (DDC) and ditridecyl adipate (ExxonMobil Chemical Company) into 1 L solution with a volume ratio of DDC/ditridecyl adipate=5/5, then add 100 g bis(2,4,5-trichlorophenyl-6-carbopentoxyphenyl) oxalate and 1.5 g 2-ethyl-9,10-Bis(phenylethynyl) anthracene into the solution, after this, heat the mixture to 80° C. and stir until bis(2,4,5-trichlorophenyl-6-carbopentoxyphenyl)oxalate and 2-ethyl-9,10-Bis(phenylethynyl)

anthracene are completely dissolved, this creates a green oxalate solution. Place it at room temperature.

The preparation of didodecyl carbonate: heat 4 mol Dodecyl alcohol to 80° C. and add 1.5% (in weight) sodium methoxide as catalyst, then drip 1 mol dimethyl carbonate into it slowly. After a 2-hour reflux reaction, use distillation devices to separate out methanol, then increase the temperature to 160° C. and maintain the temperature for 6 hours, then cool the reaction solution to room temperature and filter the catalyst, then reduce the pressure and distill out didodecyl carbonate.

F24: Combine ditridecane carbonate and 2-tridecanyl-carbonate into 1 L solution with a volume ratio=5/5, then add 100 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

The preparation of ditridecane carbonate: heat 4 mol 1-tridecanol to 80° C. and add 1.5% (in weight) sodium methoxide as catalyst, then drip 1 mol dimethyl carbonate into it slowly. After a 2-hour reflux reaction, use distillation devices to separate out methanol, then increase the reaction temperature to 160° C. and maintain it for 6 hours, then cool the reaction solution to room temperature and filter the catalyst, then reduce the pressure and distill out ditridecane carbonate.

F25: Combine bis(2-Hexyldecyl)carbonate and dioctyl adipate into 1 L solution with a volume ratio=4/6, then add 100 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

The preparation of bis(2-Hexyldecyl)carbonate: heat 4 mol 2-Hexyl-1-decanol to 80° C. and add 2% (in weight) calcium methoxide as catalyst at first, then drip 1 mol dimethyl carbonate into it slowly. After a 2-hour reflux reaction, use distillation devices to separate out methanol, then increase the reaction temperature to 160° C. and maintain it for 6 hours, then cool the reaction solution to room temperature and filter the catalyst, then reduce the pressure and distill out bis(2-Hexyldecyl)carbonate.

F26: Combine dioctadecyl carbonate and dioctyl adipate into 1 L solution with a volume ratio=5/5, then add 100 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

The preparation of dioctadecyl carbonate: heat 4 mol 1-Octadecanol to 80° C. and add 2% (in weight) calcium methoxide as catalyst, then drip 1 mol dimethyl carbonate into it slowly. After a 2-hour reflux reaction, use distillation devices to separate out methanol, then increase the reaction temperature to 160° C. and maintain it for 6 hours, then cool the reaction solution to room temperature and filter the catalyst, then reduce the pressure and distill out dioctadecyl carbonate.

F27: Combine dipropyl carbonate and tributyl citrate into 1 L solution with a volume ratio=3/7, then add 100 g bis(2,4, 5-trichloro-6-carbopentoxyphenyl)oxalate and 1.5 g 2-ethyl-9,10-Bis(phenylethynyl) anthracene into the solution, heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F28: Combine methyl dioctyl carbonate and dioctyl phthalate into 1 L solution with a volume ratio=3/7, then add 100 g bis(2,4,5-trichloro-6-carbopentoxyphenyl)oxalate and 1.5 g 2-ethyl-9,10-Bis(phenylethynyl) anthracene into the solution, heat the mixture to 80° C. and stir until bis (2,4,5-trichloro-6-carbopentoxyphenyl)oxalate and 2-ethyl-9,10-Bis(phenylethynyl) anthracene are completely dissolved, this creates a green oxalate solution. Place it at room temperature.

The preparation of methyl dioctyl carbonate: combine 4 mol dimethyl carbonate and 1 mol octanol with KOH as catalyst, and after a 2-hour reflux reaction, use distillation devices to separate out methanol, then increase the reaction temperature to 120° C. and maintain it for 2 hours, then cool the reaction solution to room temperature and filter the KOH, then reduce the pressure and distill out methyl dioctyl carbonate.

F29: Add 100 g bis(2,4,5-trichloro-6-carbopentoxyphenyl)oxalate and 1.5 g 2-ethyl-9,10-Bis(phenylethynyl) anthracene into 1 L tributyl citrate solution, then heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

F30: Add 100 g bis(2,4,5-trichloro-6-carbopentoxyphenyl)oxalate and 1.5 g 2-ethyl-9,10-Bis(phenylethynyl) anthracene into 1 L dioctyl phthalate solution, then heat the mixture to 80° C. and stir until bis(2,4,5-trichloro-6-carbopentoxyphenyl)oxalate and 1.5 g 2-ethyl-9,10-Bis(phenylethynyl) anthracene are completely dissolved, this creates a green oxalate solution. Place it at room temperature.

F31: Add 100 g bis(2,4,5-trichloro-6-carbopentoxyphenyl)oxalate and 1.5 g 2-ethyl-9,10-Bis(phenylethynyl) anthracene into 1 L didodecyl carbonate solution, then heat the mixture to 80° C. and stir until bis(2,4,5-trichloro-6-carbopentoxyphenyl)oxalate and 2-ethyl-9,10-Bis(phenylethynyl) anthracene are completely dissolved. This creates a green oxalate solution. Place it at room temperature.

F32: Add 100 g bis(2,4,5-trichloro-6-carbopentoxyphenyl)oxalate and 1.5 g 2-ethyl-9,10-Bis(phenylethynyl) anthracene into 1 L dioctadecyl carbonate solution, then heat the mixture to 80° C. and stir until bis(2,4,5-trichloro-6-carbopentoxyphenyl)oxalate and 2-ethyl-9,10-Bis(phenylethynyl) anthracene are completely dissolved, this creates a green oxalate solution. Place it at room temperature.

Y1: Combine dimethyl phthalate (hereafter referred to as DMP) and tert-butyl alcohol (hereafter referred to as TBA) into 1 L solution with a volume ratio of DMP/TBA=8/2, then calculate the value of 3% of the weight of the solution and add this amount of 85% $H_2O_2$, finally add 100 mg sodium salicylate (SS) and allow it to completely dissolve. This forms basic oxidized liquid Y1.

Y2: Combine triethyl citrate (hereafter referred to as ETC) and TBA into 1 L solution with a volume ratio of ETC/TBA=8/2, then calculate the value of 3% of the weight of the solution and add this amount of 85% $H_2O_2$, finally add 100 mg sodium salicylate (SS) and allow it to completely dissolve. This forms basic oxidized liquid Y2.

Y3: Combine dimethyl carbonate (DMC) and TBA into 1 L solution with a volume ratio of DMC/TBA=8/2, then calculate the value of 3% of the solution and add this amount of 85% $H_2O_2$, finally add 100 mg sodium salicylate (SS) and dissolve it completely. This forms basic oxidized liquid Y3.

Y4: Calculate the value of 3% of the weight of the 1 L dimethyl carbonate (DMC) solution, add this amount of 85% $H_2O_2$, then add 100 mg sodium salicylate (SS) and dissolve it completely. This forms oxidized liquid Y4.

Y5: Calculate the value of 3% of the weight of 1 L dimethyl carbonate (DMC) solution, and add this amount of 85% $H_2O_2$, and then allows it to dissolve completely, But no sodium salicylate (SS) is used. This forms oxidized liquid Y5.

Y6: Combine DMP and TBA into 1 L solution with a volume ratio of DMP/TBA=8/2, Calculate the value of 3% of the weight of the solution and add this amount of 85% $H_2O_2$, and allows it to dissolve completely. But no sodium salicylate (SS) is used. This forms oxidized liquid Y6.

Y7: Calculate the value of 3% of the weight of the 1 L propylene carbonate (PC) solution, and add this amount of 85% $H_2O_2$, then add 20 mg sodium salicylate (SS) and allows it to dissolve completely. This forms oxidized liquid Y7.

Y8: Calculate the value of 3% of the weight of the 1 L dimethyl carbonate (DMC) solution, and add this amount of 85% $H_2O_2$, and then add 20 mg sodium salicylate (SS) and allows it to dissolve completely. This forms oxidized liquid Y8.

EXAMPLE 1

Take an HB21260-0.4 MPa silicon piezoresistive pressure transmitter (manufactured by Shenyang Academy of Instrumentation Science) as a pressure measuring device, in which the output of 4-20 mA represent 0-0.4 MPa. A sealed stainless steel container with a volume of 20 ml was used as chemiluminescent reaction chamber. In the container a pressure transmitter was joined to transfer pressure information into 1-5V voltage information to be collected by a PC. The collecting frequency was one time per hour. During the measurement period, the device was under a constant temperature of 25° C.

In the reaction, oxidized liquid and luminescent liquid were taken 3 ml and 6 ml respectively. They were put into the 20 ml stainless-steel container and allowed to interact. Then the container was quickly sealed. Immediately, the PC began registering a pressure increase of the inner chamber.

Using Y1 as the oxidized liquid and separately adding each kind of luminescent liquid in Table 1, the experiment was repeated. In each experiment, the pressure-time changes were recorded in Table 1, where the pressure unit is MPa and the time unit is hour.

TABLE 1

Pressure and luminescent time

| Time | F1 DBP | F2 BB | F3 DMC | F4 DMC/DBP 2/8 | F5 DMC/DBP 3/7 | F6 DMC/DBP 4/6 | F7 DMC/BB 2/8 | F8 DMC/BB 3/7 | F9 DMC/BB 4/6 | F10 DMC/BB 3/97 |
|---|---|---|---|---|---|---|---|---|---|---|
| 1 | 0.0258 | 0.0121 | 0.0277 | 0.0492 | 0.0570 | 0.0336 | 0.0356 | 0.0414 | 0.0492 | 0.0322 |
| 2 | 0.0453 | 0.0277 | 0.0492 | 0.0688 | 0.0785 | 0.0492 | 0.0551 | 0.0609 | 0.0727 | 0.0542 |
| 3 | 0.0648 | 0.0473 | 0.0668 | 0.0863 | 0.0961 | 0.0668 | 0.0707 | 0.0785 | 0.0883 | 0.0595 |
| 4 | 0.0824 | 0.0668 | 0.0863 | 0.0981 | 0.1059 | 0.0805 | 0.0863 | 0.0922 | 0.1000 | 0.0793 |
| 5 | 0.0981 | 0.0863 | 0.0981 | 0.1078 | 0.1176 | 0.1039 | 0.0981 | 0.1039 | 0.1098 | 0.0892 |
| 6 | 0.1078 | 0.1020 | 0.1000 | 0.1215 | 0.1273 | 0.1137 | 0.1117 | 0.1137 | 0.1137 | 0.1054 |
| 7 | 0.1215 | 0.1215 | 0.1059 | 0.1273 | 0.1410 | 0.1215 | 0.1254 | 0.1234 | 0.1176 | 0.1225 |
| 8 | 0.1313 | 0.1352 | 0.1098 | 0.1352 | 0.1469 | 0.1254 | 0.1313 | 0.1332 | 0.1234 | 0.1344 |
| 9 | 0.1410 | 0.1508 | 0.1117 | 0.1430 | 0.1527 | 0.1273 | 0.1449 | 0.1449 | 0.1234 | 0.1490 |
| 10 | 0.1527 | 0.1625 | 0.1137 | 0.1469 | 0.1566 | 0.1293 | 0.1508 | 0.1488 | 0.1254 | 0.1595 |
| 11 | 0.1606 | 0.1742 | 0.1156 | 0.1527 | 0.1625 | 0.1313 | 0.1606 | 0.1527 | 0.1254 | 0.1673 |
| 12 | 0.1664 | 0.1879 | 0.1176 | 0.1586 | 0.1625 | 0.1332 | 0.1645 | 0.1527 | 0.1293 | 0.1775 |
| 13 | 0.1801 | 0.1977 | 0.1195 | 0.1606 | 0.1664 | 0.1371 | 0.1684 | 0.1586 | 0.1293 | 0.1854 |
| 14 | 0.1879 | 0.2055 | 0.1195 | 0.1625 | 0.1684 | 0.1391 | 0.1723 | 0.1606 | 0.1313 | 0.1869 |
| 15 | 0.1957 | 0.2172 | 0.1195 | 0.1684 | 0.1684 | 0.1391 | 0.1742 | 0.1625 | 0.1332 | 0.1922 |
| 16 | 0.2055 | 0.2211 | 0.1215 | 0.1703 | 0.1723 | 0.1410 | 0.1742 | 0.1645 | 0.1332 | 0.1960 |
| 17 | 0.2133 | 0.2289 | 0.1254 | 0.1723 | 0.1723 | 0.1410 | 0.1762 | 0.1664 | 0.1332 | 0.1995 |
| 18 | 0.2211 | 0.2348 | 0.1234 | 0.1742 | 0.1742 | 0.1430 | 0.1801 | 0.1684 | 0.1352 | 0.2015 |
| 19 | 0.2250 | 0.2406 | 0.1254 | 0.1762 | 0.1742 | 0.1449 | 0.1820 | 0.1703 | 0.1371 | 0.2045 |
| 20 | 0.2309 | 0.2426 | 0.1273 | 0.1820 | 0.1781 | 0.1469 | 0.1820 | 0.1703 | 0.1410 | 0.2162 |

Analyzing the data in Table 1, we can find the following results. Within 5 hours from the beginning of the reaction, all tested samples were showing an increase of pressure, which was up to 0.10-0.13 MPa. During that period, the reaction pressures of DBP (F1 group) and BB (F2 group) were a bit low and were very close to with dimethyl carbonate (DMC) as a solvent. But over the next 5 hours (during the $5^{th}$-$10^{th}$ hour), all of the reaction pressures of different solvents began to have a great variance. The pressure of 100% dimethyl carbonate (DMC) (F3 group) became the lowest one. Other reaction pressures showed differences according to the changed quantities of DMC. It was obvious that with more DMC in the reaction, the reaction pressures were lower. After the experiments' $10^{th}$ hours, the reaction pressures of pure BB (F2 group) and DBP (F1 group) solvents showed a fast rise and reached 0.24 MPa by the $20^6$ hour. But at that time, the pressure of 100% dimethyl carbonate (DMC) (F3 group) was only 0.125 MPa, and the pressures of F4 and F7 groups, which have less quantity of DMC, were only near 0.18 MPa. Even when the content of dimethyl carbonate (DMC) was only 3% (DMC account for 2% of the compound of oxidized liquid and luminescent liquid in volume) (F10 group), DMC still can embody a role in depressing the reaction pressure. Whereby we can conclude that DMC is playing an important role in decreasing the luminescent reaction pressure in sealed container and with more proportion of DMC, the total reaction pressure of the reaction will be lower.

EXAMPLE 2

The methods and devices were same with Example 1. Taking oxidized liquids Y2, Y3, Y4 and luminescent liquids F1, F2, F3, F5, F8 as reagents, we obtained chemiluminescence reaction pressure data of the $1^{st}$, $5^{th}$, $10^{th}$, $20^{th}$ hours'. See Table 2.

TABLE 2

Pressure and luminescent time

Luminescent reaction pressures Unit: MPa

|  |  | F1 DBP | F2 BB | F3 DMC | F5 DMC/ DBP 3/7 | F8 DMC/ BB 3/7 |
|---|---|---|---|---|---|---|
| Y2 ETC/TBA SS | $1^{st}$ hour | 0.0232 | 0.0122 | 0.0212 | 0.0225 | 0.0226 |
|  | $5^{th}$ hour | 0.0966 | 0.0998 | 0.0893 | 0.0930 | 0.0946 |
|  | $10^{th}$ hour | 0.1500 | 0.1622 | 0.1020 | 0.1445 | 0.1440 |
|  | $20^{th}$ hour | 0.2301 | 0.2420 | 0.1265 | 0.1900 | 0.1920 |
| Y3 DMC/TBA SS | $1^{st}$ hour | 0.0388 | 0.0323 | 0.0255 | 0.0296 | 0.0335 |
|  | $5^{th}$ hour | 0.0902 | 0.1002 | 0.1045 | 0.1140 | 0.1015 |
|  | $10^{th}$ hour | 0.1479 | 0.1515 | 0.1089 | 0.1340 | 0.1335 |
|  | $20^{th}$ hour | 0.1686 | 0.1819 | 0.1091 | 0.1470 | 0.1499 |
| Y4 DMC SS | $1^{st}$ hour | 0.0345 | 0.0353 | 0.0301 | 0.0320 | 0.0343 |
|  | $5^{th}$ hour | 0.0878 | 0.0889 | 0.0930 | 0.0993 | 0.1200 |
|  | $10^{th}$ hour | 0.1310 | 0.1500 | 0.0990 | 0.1130 | 0.1251 |
|  | $20^{th}$ hour | 0.1407 | 0.1754 | 0.1051 | 0.1162 | 0.1259 |

Analyzing the data in Table 2, we can find following results: After substituting main ingredient of basic oxidized liquid from DMP into ETC, allow the oxidized liquid to react with basic luminescent liquids, no luminescent reaction pressure decrease occurred. But for all luminescent system that contained dimethyl carbonate (DMC), no matter DMC is in oxidized liquid or in luminescent liquid, luminescent reaction pressure decrease would occur. At the same time, by contrasting with Y3 and Y4, it is demonstrated that TBA were no role in decreasing the reaction pressures. In order to observe the luminescent phenomena, we did luminescent reaction in transparent plastic luminescent tubes with similar other conditions like in the stainless steel containers. As a result, we found the light intensity of glow sticks with carbonic esters were far more strong than those without carbonic esters, and the light intensity grew stronger obviously with the increasing of carbonic esters, which proved the promoting role of carbonic esters on chemiluminescent reaction, which also proved that even different carbonic esters were used together, and would have same pressure decreasing and light intensity increasing effect.

EXAMPLE 3

We seal 3 ml oxidized liquid and 6 ml luminescent liquid into a 15 ml volume low density polyethylene (LDPE) tube (with 15 mm outer diameter). The middle of the tube was placed at 3 cm distance from the light sensor of a TES-1330 A illuminometer to measure the light intensity. We made luminescent liquid F1 react with oxidized liquid Y1, Y3, Y5, Y6, and luminescent liquid F3 react with Y1, Y3, Y5, Y6 respectively at a temperature of 25° C. We recorded the light intensity of each luminescent tube according to different reaction time in Table 3. Time unit (hour: minute). Numerical value unit: LUX.

TABLE 3

Light intensity and luminescent time luminescent liquid

| | F1 DBP | | | | F3 DMC | | | |
|---|---|---|---|---|---|---|---|---|
| | Oxidized liquid | | | | | | | |
| | Y1 SS DMP/TBA | Y3 SS DMC/TBA | Y5 DMC NO SS | Y6 DMP/TBA NO SS | Y1 SS DMP/TBA | Y3 SS DMC/TBA | Y5 DMC NO SS | Y6 DMP/TBA NO SS |
| 0:05 | 59.30 | 155.00 | 120.00 | 4.03 | 199.00 | 220.00 | 190.00 | 170.70 |
| 0:15 | 40.70 | 115.00 | 110.00 | 4.68 | 145.00 | 175.00 | 135.00 | 89.70 |
| 0:30 | 37.10 | 40.50 | 55.50 | 4.69 | 67.70 | 55.60 | 35.50 | 47.60 |
| 1:00 | 35.60 | 4.75 | 15.50 | 7.02 | 6.55 | 3.55 | 4.75 | 37.50 |
| 2:00 | 32.20 | 1.05 | 6.95 | 3.75 | 5.94 | 3.02 | 4.05 | 21.20 |
| 3:00 | 28.80 | 0.50 | 3.55 | 2.31 | 5.10 | 2.71 | 3.55 | 14.60 |
| 4:00 | 22.70 | 0.09 | 0.03 | 1.59 | 0.38 | 0.11 | 0.23 | 8.91 |
| 5:00 | 13.00 | 0.01 | 0.02 | 1.99 | 0.03 | 0.01 | 0.02 | 5.63 |
| 6:00 | 12.20 | 0.01 | 0.01 | 1.10 | 0.01 | 0.01 | 0.02 | 3.45 |
| 7:00 | 9.95 | 0.01 | 0.01 | 0.87 | 0.00 | 0.00 | 0.01 | 0.99 |
| 8:00 | 8.18 | 0.01 | 0.01 | 0.56 | 0.00 | 0.00 | 0.00 | 0.35 |
| 9:00 | 6.45 | 0.00 | 0.01 | 0.44 | 0.00 | 0.00 | 0.00 | 0.12 |

We can know from Table 3 that: without basic catalyst (sodium salicylate), traditional luminescent system (such as F1 and F6) only may export rather low light intensity. But carbonic esters are capable of enhancing chemiluminescent reaction, at the same time, luminescent systems that contain carbonic esters (F1 and Y5; F3 and Y6; F3 and Y5) may export high light intensity even if without basic catalyst (sodium salicylate). Beside so, chemiluminescent systems that contain carbonic esters and basic catalysts together can export rather high light intensity, which indicates that chemiluminescent systems that contain carbonic esters don't repel all present catalysts. Table 3 also demonstrates that the primary light intensities of chemiluminescent systems that contain carbonic esters were high, but they wane quickly. So the ratio of carbonic esters and CPPO or other materials should be adjusted according to actual requirements.

EXAMPLE 4

Using oxidized liquid Y1 separately experimented with luminescent liquids F12 (BB) and F11 (DBC), which have high concentration CIPO. In this example, change fluorescing agent into blue fluorescing agent 9,10-bis(4-methoxyphenl)-2-chloroanthracene. Other experiment methods were same with example 3, reaction temperature was 25° C. The light intensity of each experiment was recorded according to different reaction time. See Table 4. Time unit (hour: minute: second). Numerical value unit: LUX.

TABLE 4

Light intensity and luminescent time

|  | F12 | F11 |
| --- | --- | --- |
| 0:05:00 | 7.82 | 11.4 |
| 0:15:00 | 7.01 | 8.35 |
| 0:30:00 | 4.82 | 6.76 |
| 1:00:00 | 2.72 | 4.47 |
| 2:00:00 | 1.14 | 1.26 |
| 3:00:00 | 0.65 | 0.95 |
| 4:00:00 | 0.52 | 0.65 |
| 5:00:00 | 0.39 | 0.44 |
| 6:00:00 | 0.14 | 0.36 |
| 7:00:00 | 0.10 | 0.22 |
| 8:00:00 | 0.05 | 0.15 |
| 9:00:00 | 0.02 | 0.09 |

Because it is high concentration CIPO and the solubility of CIPO is very low in actual use, when the solution was cooled down to room temperature, most of CIPO was separated out and consisted in the luminescent system in solid state. So when it was compounded with oxidized liquid, CIPO was dissolved into reaction liquid gradually. In luminescent system with BB as solvent, CIPO can not be dissolved easily, which may cause such problems: unstable luminescence; light intensity is easy to decline swiftly and may grow up again with shaking. Carbonic esters are playing an enhancing role on luminescent reaction, when luminescent liquids containing carbonic esters of CIPO as solvents combined with oxidized liquid and begun to give out light, there may exist many solid materials in the solvent, but the reaction can continue stably, and superior and stable light can be obtained. We can find from table 4 that the reaction between basic oxidized liquid and luminescent liquids with carbonic esters as solvents were far better than those without carbonic esters as solvents in chemiluminescent systems.

EXAMPLE 5

Using oxidized liquid Y1 separately experimented with luminescent liquid F13, F14, F15, F16, F17, and F18.

1. Measure the pressure of the reaction between oxidized liquid Y1 and each luminescent liquid, with the same method in Example 1. The inner-container pressures of each luminescent system at the time of the $20^{th}$ hour can be seen at Table 5.

TABLE 5

Pressures at the $20^{th}$ hour
Reaction pressure Unit: MPa (Y1 DMP/TBA)

|  | luminescent liquid No. | | | | | |
| --- | --- | --- | --- | --- | --- | --- |
|  | F13 | F14 | F15 | F16 | F17 | F18 |
| The $20^{th}$ hour | 0.1311 | 0.1354 | 0.1202 | 0.1415 | 0.1305 | 0.1219 |

Contrasting the data of Table 5 and Table 1 at the time of the $20^{th}$ hour (F1 and Y120 h 0.2309 MPa), we can find the chemiluminescent solution containing carbonic esters as solvent have lower reaction pressures.

2. Measure the light intensities of the reaction between oxidized liquid Y1 and each luminescent liquid, with the same method in Example 3.

A chemiluminescent reaction of a maximum lifetime of about 12 hours and the biggest light intensity of 192 LUX was observed in a plastic tube.

EXAMPLE 6

Place luminescent liquids F19, F20, F21, F23 at room temperature, and observe if bis(2,4,5-trichloro-6-carbopentoxyphenyl) oxalate is separated out.

TABLE 6

CPPO precipitation by crystallization

| luminescent liquid No. | F19 | F20 | F21 | F23 |
| --- | --- | --- | --- | --- |
| CPPO precipitation by crystallization | No | No | Yes | No |

Table 6 shows 135 g/L (0.2M) CPPO can not be fully dissolved by didecyl carbonate. It indicates that, when carbon number of carbonic esters grows to 10, 0.2M CPPO solutions can not be obtained under room temperature.

EXAMPLE 7

Using oxidized liquid Y7 and Y8 separately experimented with luminescent liquid F3, F19, F20.

Measure the reaction pressures between each luminescent liquid and each oxidized liquid with the same methods in Example 1. The inner-container pressures of each luminescent system at the 20$^{th}$ hour can be seen in Table 7. Measure the light intensity of each reaction with the same method in Example 3, Results can be seen in Table 8.

TABLE 7

Chemiluminescent reaction pressure Unit: MPa

| | luminescent liquid | | | | | |
|---|---|---|---|---|---|---|
| | F3 DMC | | F19 DBC oxidized liquid | | F20 DOC | |
| | Y8 DMC | Y7 PC | Y8 DMC | Y7 PC | Y8 DMC | Y7 PC |
| The 20$^{th}$ hour | 0.1054 | 0.1075 | 0.1221 | 0.14 | 0.1245 | 0.1559 |

TABLE 8

Light intensity and luminescent time Light intensity unit: Lux

| | luminescent liquid | | | | | |
|---|---|---|---|---|---|---|
| | F3 DMC | | F19 DBC oxidized liquid | | F20 DOC | |
| | Y8 DMC | Y7 PC | Y8 DMC | Y7 PC | Y8 DMC | Y7 PC |
| 0:05 | 200.00 | 179.00 | 131.00 | 95.00 | 130.00 | 89.00 |
| 0:15 | 145.00 | 132.00 | 89.00 | 80.20 | 105.00 | 80.00 |
| 0:30 | 54.20 | 65.30 | 73.00 | 75.10 | 85.90 | 72.36 |
| 1:00 | 4.65 | 12.00 | 23.00 | 65.50 | 29.00 | 67.55 |
| 2:00 | 3.15 | 3.52 | 11.50 | 31.60 | 13.90 | 43.30 |
| 3:00 | 2.73 | 3.00 | 7.52 | 24.30 | 8.00 | 35.50 |
| 4:00 | 0.17 | 0.53 | 3.75 | 16.80 | 3.65 | 28.90 |
| 5:00 | 0.02 | 0.05 | 1.15 | 12.80 | 0.88 | 21.40 |
| 6:00 | 0.02 | 0.04 | 0.69 | 9.93 | 0.73 | 18.88 |
| 7:00 | 0.01 | 0.02 | 0.15 | 6.69 | 0.35 | 12.65 |
| 8:00 | 0.00 | 0.01 | 0.09 | 3.20 | 0.28 | 9.94 |
| 9:00 | 0.00 | 0.00 | 0.06 | 3.00 | 0.22 | 7.81 |

Analyzing Table 7, we can find that the reaction pressures of chemiluminescent compounds containing dimethyl carbonate (DMC) were low at the 20$^{th}$ hour. With the increasing of the length of carbon chain of carbonic esters, the reaction pressure grew a little higher than those with short carbon chain of carbonic esters correspondingly. But contracting with Example 1 and 2, we still find that carbonic ester solvents have a role in decreasing the chemiluminescent reaction pressure from the chemiluminescent solutions without carbonic esters. Under the same reaction conditions, propylene carbonate (PC) has a little higher reaction pressure than dimethyl carbonate (DMC).

Analyzing Table 8, we can find that with the increasing of the length of carbon chain of carbonic esters, the lighting effects during the later reaction period were improved outstandingly; especially the lighting curve of dicaprylyl carbonate (DOC) was rather stable. During the experiment, we also found dicaprylyl carbonate (DOC) had a suitable solubility to CPPO. DOC has a high flashpoint and is nontoxic, so it is very suitable to make chemiluminescent solution. By the contrasting of oxidized liquid Y7 and Y8, we can find oxidized liquids that containing propylene carbonate (PC) has more flat lighting curve than those that containing dimethyl carbonate (DMC). Propylene carbonate (PC) also has a high flashpoint, and is also very suitable to make chemiluminescent solution.

EXAMPLE 8

Place luminescent liquids F22, F23, F24, F25, F26, F27, F28, F29, F30, F31, F32 at room temperature, and observe if bis(2,4,5-trichloro-6-carbopentoxyphenyl)oxalate is separated out. The results can be seen in Table 9.

TABLE 9

CPPO precipitation by crystallization

| | luminescent liquid No. | | | | | | | | | | |
|---|---|---|---|---|---|---|---|---|---|---|---|
| | F22 | F23 | F24 | F25 | F26 | F27 | F28 | F29 | F30 | F31 | F32 |
| CPPO precipitation by crystallization | No | No | No | No | No | No | No | Yes | Yes | Yes | Yes |

For actual chemiluminescent product, 100 g (CPPO) per liter (0.15 M) is an important, practicable and economic concentration. Because CPPO precipitation in luminescent liquid may induce nonuniform lighting and difficulty in automatic filling, most lighting liquids need to satisfy this concentration. In Example 6, luminescent liquid F20 (DOC) can apply to 0.2 M CPPO concentration, but with the increasing of carbonic number, its solubility to CPPO depress obviously. In this Example, didecyl carbonate can dissolve 0.15 M CPPO, but in Example 6, if try to dissolve 0.2 M CPPO, then when cooling down to room temperature, CPPO will separated out by crystallization. From above Table, we know the solubility of didodecyl carbonate (12 Carbon) to CPPO is less than 0.15 M. But combined with a certain quantity of ditridecyl adipate, didecyl adipate, dioctyl adipate and so on, which have good solubility to CPPO, can improve the solubility of didodecyl carbonate (DDC), bis(2-Hexyldecyl)carbonate, dioctadecyl carbonate to CPPO by approximately 0.15M.

Similarly, the solubility to CPPO of solutions (such as tributyl citrate, dioctyl phthalate, which have weak solubility to CPPO) can be improved by combining carbonic esters that with low carbonic chain number.

EXAMPLE 9

Using oxidized liquid Y1 separately experimented with luminescent liquids F22, F23, F24, F25, F26, F27, F28, F29, F30, F31, F32.

1. Measure the reaction pressure of each luminescent system at the 20$^{th}$ hour in the container with the same method in Example 1. Among the above luminescent liquids, F29, F30, F31, F32 had CPPO separated out, and need heating to dissolve CPPO before sampling. The results were showed in Table 10.

TABLE 10 the reaction pressures of F22-F32 and Y1 at the 20th hour

| | luminescent liquid No. | | | | | | | | | | |
|---|---|---|---|---|---|---|---|---|---|---|---|
| | F22 | F23 | F24 | F25 | F26 | F27 | F28 | F29 | F30 | F31 | F32 |
| MPa | 0.072 | 0.109 | 0.1312 | 0.1212 | 0.1202 | 0.1365 | 0.1425 | 0.1522 | 0.1641 | 0.082 | 0.098 |

Contrasting data in Table 10, and the situations of F29 and F30 without carbonic esters, other chemiluminescent solutions that use carbonic esters as solvents had lower reaction pressures.

2. Measure the lighting intensities of each luminescent system with the same method in Example 3.

The chemiluminescent reactions in plastic tubes, a maximum lifetime of about 10 hours and the biggest light intensity of 192 LUX were also observed in the luminescent liquid groups containing carbonic esters.

INDUSTRY APPLYING

Applying carbonic ester compounds into the preparation of solvents for chemiluminescent systems has following beneficial effects: 1. it can decrease the reaction pressure of chemiluminescent compositions effectively, thus make it possible to use lighter and thinner container shell of luminescent devices; 2. Because carbonic ester compounds can absorb $CO_2$ produced during the reaction, which facilitates reaction balance heading to luminescence reaction, generate larger luminescent output without adding catalyst. This application provides a new method in making high light intensity products with luminescent compound, especially for those which are not sensitive with catalyst. 3. Because of the enhancing effect of carbonic ester compounds on luminescent reaction, the dosage of catalyst in the chemiluminescent compound can be canceled or decreased. Contrasting with the effects of catalysts, these improving effects have a relative lagging characteristic, which can decrease influences of over-high output at the reaction start caused by catalyst, and ensure stable light output from luminescent combinations during the whole reaction course. 4. If considering the security, carbonic ester compounds, especially long carbon chain carbonic ester, have the characters of non-toxic and high flash point, and have suitable solubility on ordinary bis oxalate ester. 5. As for environment protection, carbonic ester compounds are environment-friendly solvents, which can be widely accepted and recognized no matter in industrial synthesization or applications.

The invention claimed is:

1. A method of using carbonic ester compounds in the preparation of solvents for chemiluminescent compositions, wherein said chemiluminescent compositions comprise oxidized liquid and luminescent liquid, the method comprising the step of combining the oxidized liquid and the luminescent liquid, wherein the luminescent liquid includes bis oxalate ester, a fluorescing agent and solvents, wherein the solvents include the carbonic ester compounds; and wherein the oxidized liquid includes hydrogen peroxide and solvents, said solvents including the carbonic ester compounds.

2. The method according to claim 1 wherein said carbonic ester compounds have the following structural formula (I):

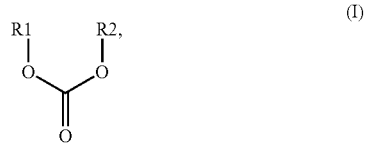

wherein $R_1$ and $R_2$ are identical or different, and each of $R_1$ and $R_2$ includes about 1 to about 18 carbon atoms in total, with $R_1$ and $R_2$ being any group selected from the group consisting of
1) linear or branched alkyl group,
2) cycloalkyl group,
3) the group defined in 1) or 2) substituted by halogen,
4) the group defined in 1) substituted by alkoxy, and
5) alkylidene or alkenylene group, and
wherein, if either $R_1$ or $R_2$ is an alkylidene or alkenylene group, the carbonic ester compounds have the following structural formula (II) or (III) respectively:

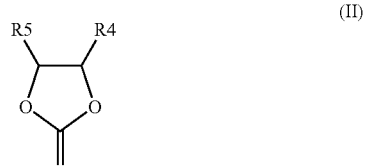

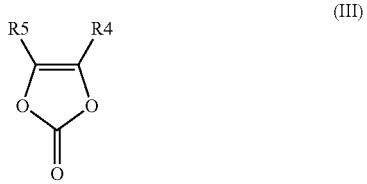

wherein each of $R_4$ and $R_5$ is selected from the group consisting of a hydrogen atom, a $C_1$-$C_6$ alkyl group or a $C_1$-$C_6$ cycloalkyl group.

3. The method according to claim 2 wherein said carbonic ester compounds are selected from the group consisting of dimethyl carbonate, dibutyl carbonate, dicaprylyl carbonate, propylene carbonate or butyl methyl carbonate.

4. The method according to claim 3 wherein said carbonic ester compounds are dicaprylyl carbonate or propylene carbonate.

5. The method according to claim 1 wherein said carbonic ester compounds account for 1% or more of total volume of said chemiluminescent compositions.

6. The method according to claim 1 wherein said solvents further contain other organic solvents in addition to said carbonic ester compounds, the other organic solvents being selected from the group consisting of dibutyl phthalate, dimethyl phthalate, dioctyl phthalate, butyl benzoate, ethyl benzoate, tert-butyl alcohol, tributyl citrate, triethyl citrate, dioctyl adipate, dodecyl adipate, and ditridecyl adipate.

7. The method according to claim 1 wherein in the said luminescent liquid, said carbonic ester compounds in the solvents account for 1-98% of the luminescent liquid volume.

8. The method according to claim 1 wherein in the said oxidized liquid, said carbonic ester compounds in the solvents account for 1-98% of the oxidized liquid volume.

9. The method according to claim 6 wherein in the luminescent liquid, the volume ratios of said carbonic ester compounds to the other solvents are from 3:7 to 7:3.

10. A chemiluminescent composition, which comprises oxidized liquid and luminescent liquid, wherein the luminescent liquid includes bis oxalate ester, a fluorescing agent and solvents, wherein the solvents include carbonic ester compounds; and wherein the oxidized liquid includes hydrogen peroxide and solvents, wherein said solvents contain carbonic ester compounds, wherein the structural formula of said carbonic ester compounds is described in (I):

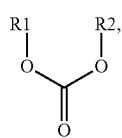

(I)

wherein, $R_1$ and $R_2$ are identical or different, and each of $R_1$ and $R_2$ includes about 1 to about 18 carbon atoms in total, with $R_1$ and $R_2$ being any group selected from the group consisting of
1) linear or branched alkyl group,
2) cycloalkyl group,
3) the group defined in 1) or 2) substituted by halogen,
4) the group defined in 1) substituted by alkoxy, and
5) alkylidene or alkenylene group, and wherein, if either $R_1$ or $R_2$ is an alkylidene or alkenylene group, the carbonic ester compound has the following structural formula (II) or (III) respectively:

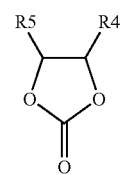

(II)

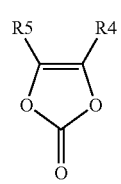

(III)

wherein, each of $R_4$ and $R_5$ is selected from the group consisting of a hydrogen atom, a $C_1$-$C_6$ alkyl group or a $C_1$-$C_6$ cycloalkyl group.

11. The composition according to claim 10 wherein said carbonic ester compounds are selected from the group consisting of dimethyl carbonate, dibutyl carbonate, dicaprylyl carbonate, propylene carbonate or butyl methyl carbonate.

12. The composition according to claim 11 wherein said carbonic ester compounds are dicaprylyl carbonate or propylene carbonate.

13. The composition according to claim 10 wherein said solvents further contain other organic solvents in addition to said carbonic ester compounds, being selected from the group consisting of dibutyl phthalate, dimethyl phthalate, dioctyl phthalate, butyl benzoate, ethyl benzoate, tert-butyl alcohol, tributyl citrate, triethyl citrate, dioctyl adipate, dodecyl adipate, and ditridecyl adipate.

* * * * *